US012508691B2

(12) United States Patent
Hjorth Hansen

(10) Patent No.: US 12,508,691 B2
(45) Date of Patent: Dec. 30, 2025

(54) SELF-RELEASING CLAMPING TOOL

(71) Applicant: Allan Hjorth Hansen, Panama (PA)

(72) Inventor: Allan Hjorth Hansen, Panama (PA)

( * ) Notice: Subject to any disclaimer, the term of this patent is extended or adjusted under 35 U.S.C. 154(b) by 502 days.

(21) Appl. No.: 17/971,468

(22) Filed: Oct. 21, 2022

(65) Prior Publication Data

US 2023/0039990 A1 Feb. 9, 2023

Related U.S. Application Data

(63) Continuation-in-part of application No. 16/785,505, filed on Feb. 7, 2020, now Pat. No. 11,479,059.

(60) Provisional application No. 62/803,171, filed on Feb. 8, 2019.

(51) Int. Cl.
*B25B 5/14* (2006.01)
*B25B 5/16* (2006.01)

(52) U.S. Cl.
CPC . *B25B 5/14* (2013.01); *B25B 5/16* (2013.01)

(58) Field of Classification Search
CPC ........ B23Q 16/006; B23Q 16/10; B23Q 3/06; B60B 2340/50; B60B 2340/52; B60B 3/14; B60B 30/00; B60B 7/068; G01B 21/26; G01B 2210/10; G01B 3/12; G01B 5/255; G01M 1/045
See application file for complete search history.

(56) References Cited

U.S. PATENT DOCUMENTS

| 3,143,327 | A | 8/1964 | John | |
|---|---|---|---|---|
| 4,885,962 | A | 12/1989 | Summers | |
| 8,079,580 | B2 * | 12/2011 | Ohnesorge | G01M 1/045 269/57 |
| 9,186,777 | B2 * | 11/2015 | Woods | B25B 5/04 |
| 10,900,856 | B2 | 1/2021 | Hansen | |
| 2004/0003646 | A1 | 1/2004 | Herbold | |
| 2007/0263951 | A1 * | 11/2007 | Fietz | D01H 4/12 384/549 |
| 2015/0069824 | A1 | 3/2015 | Matsler | |

FOREIGN PATENT DOCUMENTS

| GB | 170283 A | 7/1922 |
|---|---|---|
| GB | 2513905 A | 11/2014 |

* cited by examiner

*Primary Examiner* — Tyrone V Hall, Jr.

(57) ABSTRACT

A self-releasing clamping tool includes an adapter plate and a planetary gear assembly. The planetary gear assembly includes a central gear and a plurality of adjustable-bolt-pattern gears. The adapter plate includes an inner annular body, a central opening, and a connector plate. The inner annular body is concentrically positioned within the connector plate. The inner annular body is adjacently connected onto a rear surface of the connector plate. The central opening normally traverses through the connector plate. The central opening concentrically is positioned within the inner annular body. The central gear is rotatably mounted to a front surface of the connector plate. The plurality of adjustable-bolt-pattern gears is distributed around the central gear thus allowing to adjust according to lug-holes of the wheel. The plurality of adjustable-bolt-pattern gears is detachably and rotatably mounted to the front surface of the connector plate and mechanically engaged to the central gear.

15 Claims, 10 Drawing Sheets

SELF-RELEASING CLAMPING TOOL

The current application is a continuation-in-part (CIP) application of the U.S. non-provisional application Ser. No. 16/785,505 filed on Feb. 7, 2020. The current application claims a priority to the U.S. Provisional Patent application Ser. No. 62/803,171 filed on Feb. 8, 2019.

FIELD OF THE INVENTION

The present invention relates generally to clamping systems. More specifically, the present invention is an adjustable wheel balancing clamping with an integrated damage-prevention system.

BACKGROUND OF THE INVENTION

While most vehicles on the road have unique features and characteristics, all are equipped with tires to transfer the torque from the drivetrain to the ground and propel the automobile. Numerous types of tires are available depending on the application and type of vehicle. As an example, a sports car will have widely different tires than a truck or an off-road vehicle. Balanced wheels are required in any vehicle to ensure the wheel spins accurately regardless of the external forces that results from the rotational movement or road imperfections. If the wheel is statically or dynamically imbalanced, the driver may experience vibrations in the vehicle.

Furthermore, excessive tire wear, and premature failure of the suspension components can occur if the wheels are out of balance. Numerous wheel balancing machines are available on the market, thus giving the consumer the option to choose a device that best suits their needs and budget. While each wheel balancer has individual options and features, the working principles remain largely the same throughout. The wheel is secured onto a balancing shaft, which rotates the wheel at various speeds, highlighting equilibrium defects in the wheel assembly. The machine indicates where the user must place weights of various sizes or adjust to achieve the desired result.

A critical step in the wheel balancing process is securing the wheel to the balancing machine. The combination of tight tolerances and the relatively high rpm demands precision and consistency at every step of the balancing process. The technician must ensure the wheel is centered perfectly onto the shaft, and that it remains fixated during the balancing process to eliminate the possibility of errors. Traditionally the wheel is attached to the machine using a variety of clamping tools. The accuracy with which the wheel is balanced is directly proportional to the ability of the clamping tool to secure, center and torque the wheel during the process. The best wheel balancing clamping tools use studs to apply pressure on the lug nut holes of the wheel assembly, in the same fashion wheels are mounted onto a vehicle. Due to the wide range of bolt patterns available, these studs are designed to replicate a traditional wheel lug nut.

Clamping tools for wheel balancers are designed with a high-level of precision, and usually they are manufactured out of hardened metal alloys to ensure accurate usability even after extended cycling loading cycles. Due to the working environment to which the tool is exposed, it is common for users to accidentally drop the device on the ground. If the clamping tool is dropped on the floor, it is common for the studs to break or bend damaging the unit. Even if the clamping tool remains in one piece, the impact forces can affect the accuracy of the tool. If the tolerances have been compromised, and the wheel is balanced using the inaccurate clamping tool, the rim will inevitably inherit the inaccuracies. Replacing these tools may not always be a possibility, especially in lower cost applications, therefore in numerous cases the user continues to use the wheel-clamping tools without being aware of the offset tolerances. As a result, the wheels are not balanced accurately. The only way to guarantee a perfectly balanced, vibration free wheel is to clamp and center the rim onto the balancer in the same virtually identical fashion it is attached to the vehicle.

The present invention aims to solves these problems by disclosing a clamping tool that is impact resistant, and self-releasing when dropped. Furthermore, the present invention is able to structurally strengthen the studs to maintain the accuracy of the clamping tool. The present invention also functions as a single-handed assembly as the operator can easily adjust the present invention with only one of their hands.

DETAIL DESCRIPTIONS OF THE INVENTION

All illustrations of the drawings are for the purpose of describing selected versions of the present invention and are not intended to limit the scope of the present invention.

Referring to FIGS. 1-4, the present invention, the self-releasing clamping tool, is a device that enables an operator to reliably mount a wheel on a wheel balancing machine in a desired orientation. To accomplish this, the present invention employs a damage mitigation system that causes the studs attached to a wheel balancing plug plate to become quickly detached from the plug plate when the plug plate is dropped. This prevents the studs or plug plate from being bent or deformed by being dropped. In addition to damage mitigation, the present invention makes use of a single-handed stud adjustment system that enables the present invention to function as a universal wheel balancing tool. To achieve the above-described functionalities, the present invention comprises an adapter plate 1 and a planetary gear assembly 9.

Referring to FIGS. 1-4, 9, and 10, the adapter plate 1 is a plug plate that is designed to accommodate wheels of varying shape and size. The planetary gear assembly 9 is an adjustable mounting system with a collection of studs that can be repositioned to accommodate wheels of varying shape and size. To accomplish this, the planetary gear assembly 9 comprises a central gear 10 and a plurality of adjustable-bolt-pattern gears 11. Each of the plurality of adjustable-bolt-pattern gears 11 functions similarly to a plug-in stud that retains the wheel being balanced in a desired orientation. Additionally, the central gear 10 and the plurality of adjustable-bolt-pattern gears 11 function as a synchronized mounting system that can be adjusted based on the specifications of the wheel being balanced. The configuration of the adapter plate 1 enables the operator to adjust the plurality of adjustable-bolt-pattern gears 11 by utilizing only one hand thus freeing the other hand.

Figure 9:
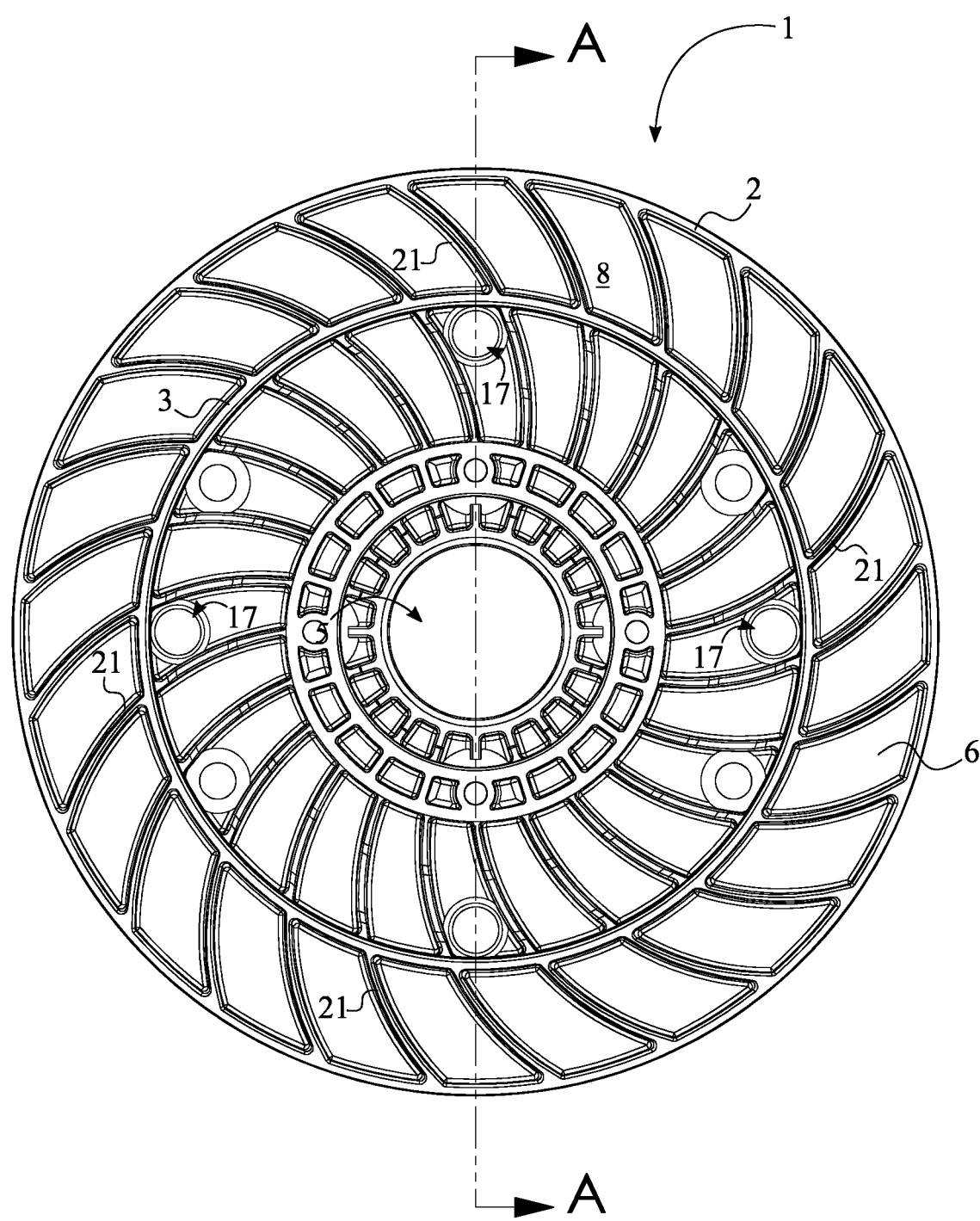
FIG. 9 is a rear view of the adapter plate of the present invention, showing the plane upon which a cross sectional view is taken.
Figure 10:
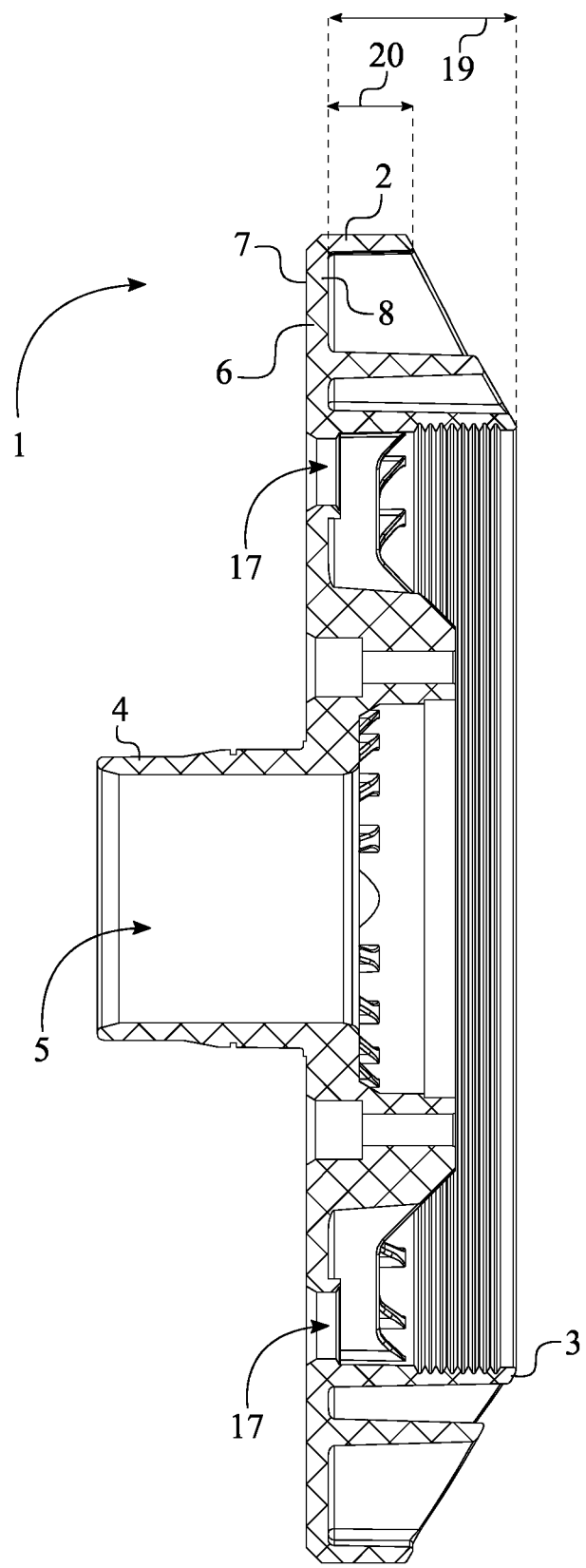
FIG. 10 is a cross section view of the adapter plate of the present invention taken along line A-A in FIG. 9.

The adapter plate 1 comprises an inner annular body 3, a central opening 5, and a connector plate 6 as shown in FIGS. 9 and 10. The inner annular body 3 is concentrically positioned within the connector plate 6 and adjacently connected onto a rear surface 8 of the connector plate 6. As a result, the inner annular body 3 is able to outwardly extend from the rear surface 8 thus allowing the operator to securely grip the present invention through the inner annular body 3. In order to provide sufficient surface area to grip the present invention, a first depth 19 of the inner annular body 3 has to be greater than 10 millimeters (mm) so that the operator can squeeze the inner annular body 3 in between the operator's palm and fingers. Preferably, the first depth 19 is 20-25 mm so that the operator's thumb can reach the outer edge of the connector plate 6 comfortably; however, the first depth 19 is not limited any dimensions greater than 10 mm and can differ upon user preference.

Referring to FIGS. 1-5, since the present invention is designed to be used with a traditional wheel balancing machine, the central opening 5 normally traverses through the connector plate 6 and concentrically positioned within the inner annular body 3. Thus positioned, the central opening 5 enables the present invention to be slid onto the rotating axle of the wheel balancing machine. Preferably, the present invention further comprises an adjustable clamp. The adjustable clamp is adjacently mounted to the adapter plate 1 so that the adjustable clamp is able to press the planetary gear assembly 9 against the wheel being balanced. Thus, clamping the wheel in place on the wheel balancing machine and ensuring an accurate balancing operation.

In reference to FIGS. 1-4, the central gear 10 is rotatably mounted onto a front surface 7 of the connector plate 6. As a result, the central gear 10 is able to rotate about a central axis that concentrically positioned to the connector plate 6 without becoming dismounted from the adapter plate 1. The plurality of adjustable-bolt-pattern gears 11 is radially distributed around the central gear 10 to match and adjust with different bolt patterns. Furthermore, the plurality of adjustable-bolt-pattern gears 11 is detachably and rotatably mounted to the front surface 7 of the connector plate 6 and mechanically engaged to the central gear 10. Consequently, each of the plurality of adjustable-bolt-pattern gears 11 is able to break away from the adapter plate 1 when the adapter plate 1 is dropped. Furthermore, rotation for each of the plurality of adjustable-bolt-pattern gears 11 is synchronized by the rotation of the central gear 10 so that the operator is able to reposition the plurality of adjustable-bolt-pattern gears 11 to correspond to the lug-holes of the wheel being balanced. For example, when an arbitrary gear of the plurality of adjustable-bolt-pattern gears 11 is individually rotated by the operator's thumb, the arbitrary gear is able to simultaneously rotates the central gear 10 which in return rotates remaining gears of the plurality of adjustable-bolt-pattern gears 11.

Figure 7:
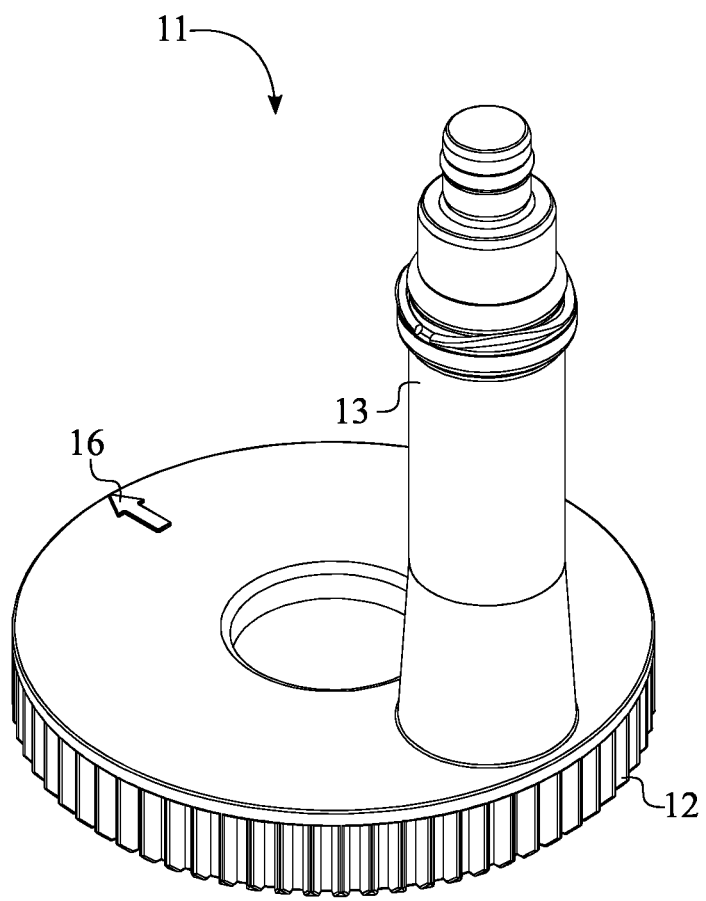
FIG. 7 is a top perspective view for one of the plurality of adjustable-bolt-pattern gears of the present invention.
Figure 8:
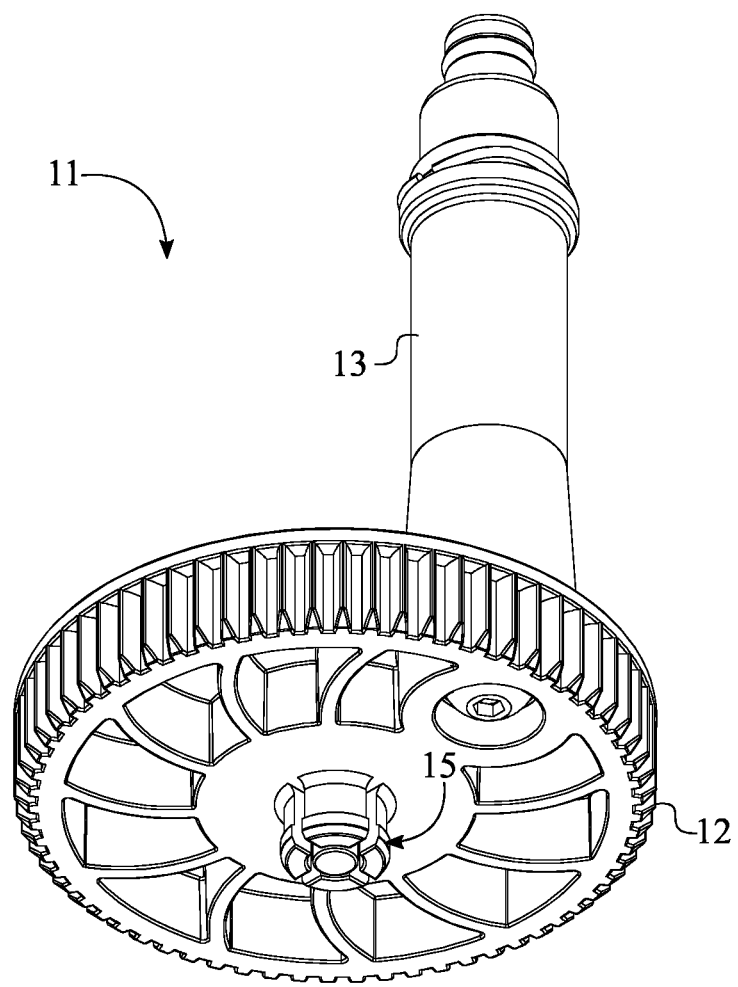
FIG. 8 is a bottom perspective view for one of the plurality of adjustable-bolt-pattern gears of the present invention.

Each of the plurality of adjustable-bolt-pattern gears 11 may comprise a base gear 12, a support stud 13, and a release mechanism 15 as shown in FIGS. 7 and 8. The release mechanism 15 is concentrically mounted to a bottom surface of the base gear 12 so that the base gear 12 can be detachably and removably mounted to the connector plate 6 as part of the damage mitigation system. More specifically, the release mechanism 15 is a coupling system that enables the plurality of adjustable-bolt-pattern gears 11 to become decoupled from the adapter plate 1 when subjected to external forces that exceed a predetermined threshold. As such, the release mechanism 15 rotatably attach the base gear 12 to the adapter plate 1. Accordingly, the release mechanism 15 is disengaged when the adapter plate 1 is dropped thus, preventing the plurality of adjustable-bolt-pattern gears 11 from becoming bent or otherwise damaged. Additionally, the release mechanism 15 allows the user to reassemble and service the present invention, using only basic hand-tools or no tools at all. The support stud 13 is a rigid rod that extends through the lug-hole of the wheel. The support stud 13 is terminally mounted to a top surface of the base gear 12 as the release mechanism 15 and the support stud 13 are oppositely oriented from each other about the base gear 12. Furthermore, the support stud 13 is positioned offset from the release mechanism 15 as the support stud 13 is designed to be inserted into the lug-hole of the wheel and used to rotate the wheel at a desired rate during wheel balancing operations. Preferably, the support stud 13 is detachably mounted onto the base gear 12 to further improve the damage mitigation system. In other words, depending upon the impact force that the present invention is dropped, the support stud 13 can decouple from the base gear 12, rather than the base gear 12 being decoupled from the adapter plate 1. However, the support stud 13 can also be mounted onto the base gear 12 via a structural screw or any other types of fasteners.

Figure 1:
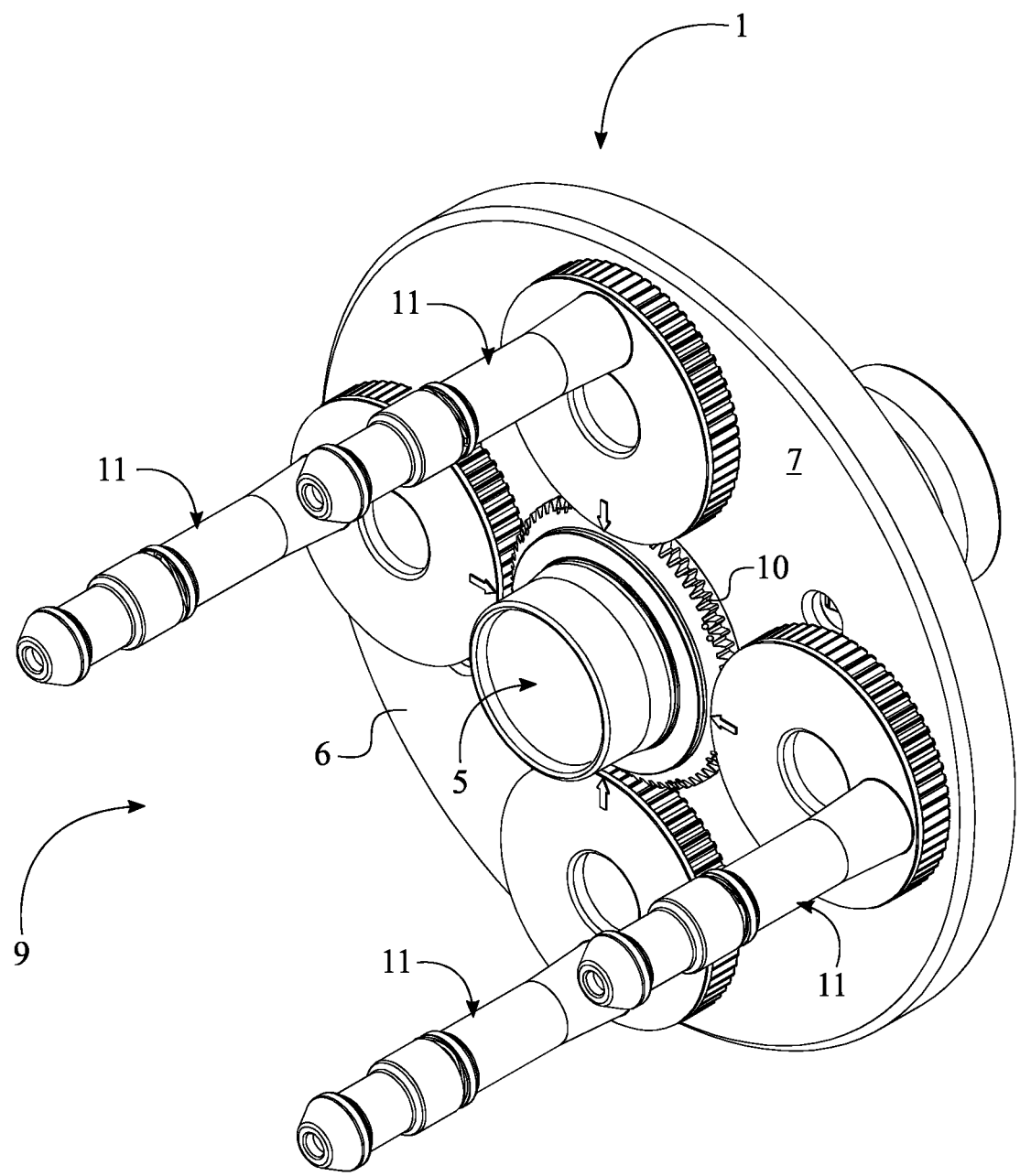
FIG. 1 is a front perspective view of the present invention.
Figure 2:
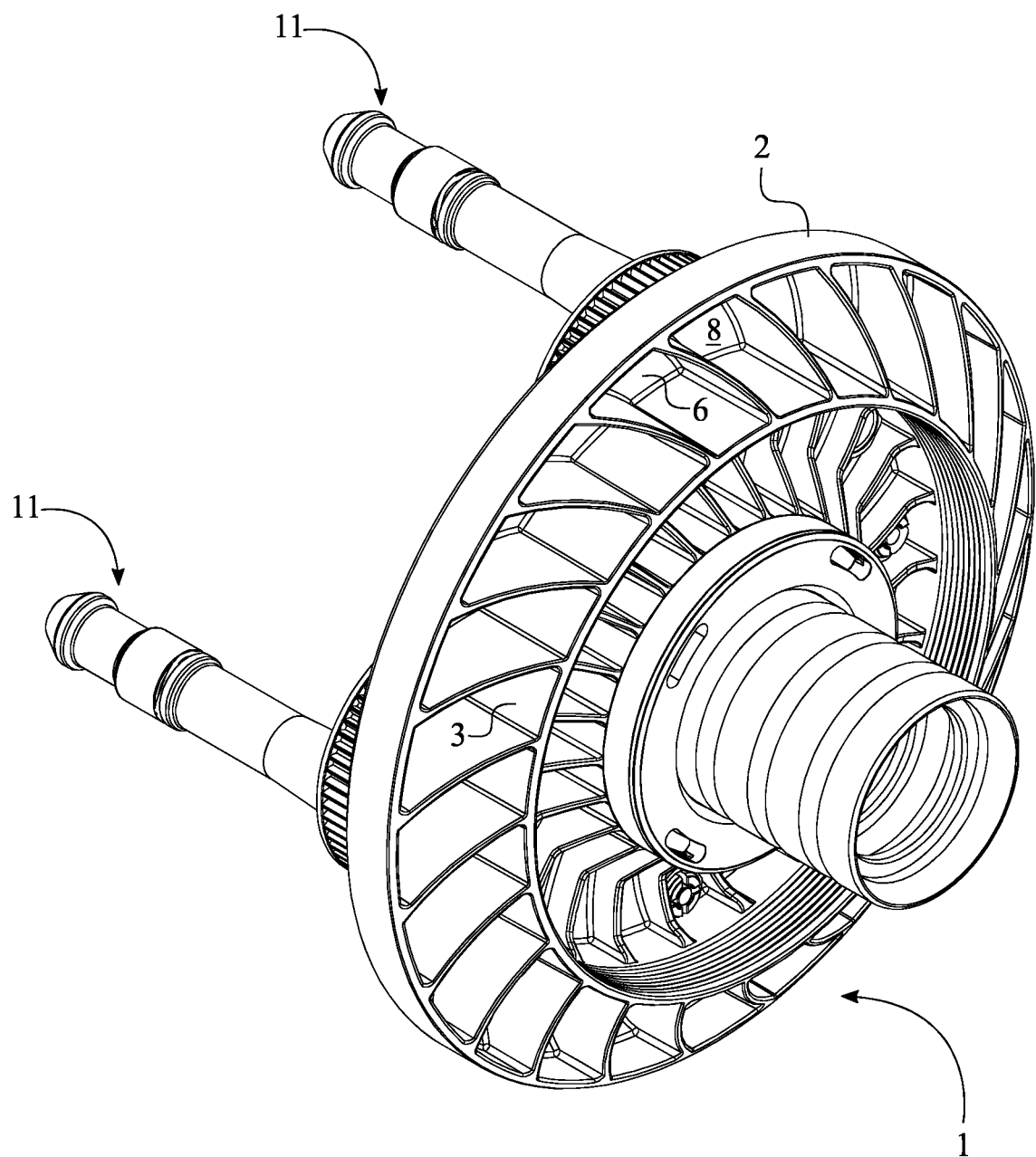
FIG. 2 is a rear perspective view of the present invention.
Figure 3:
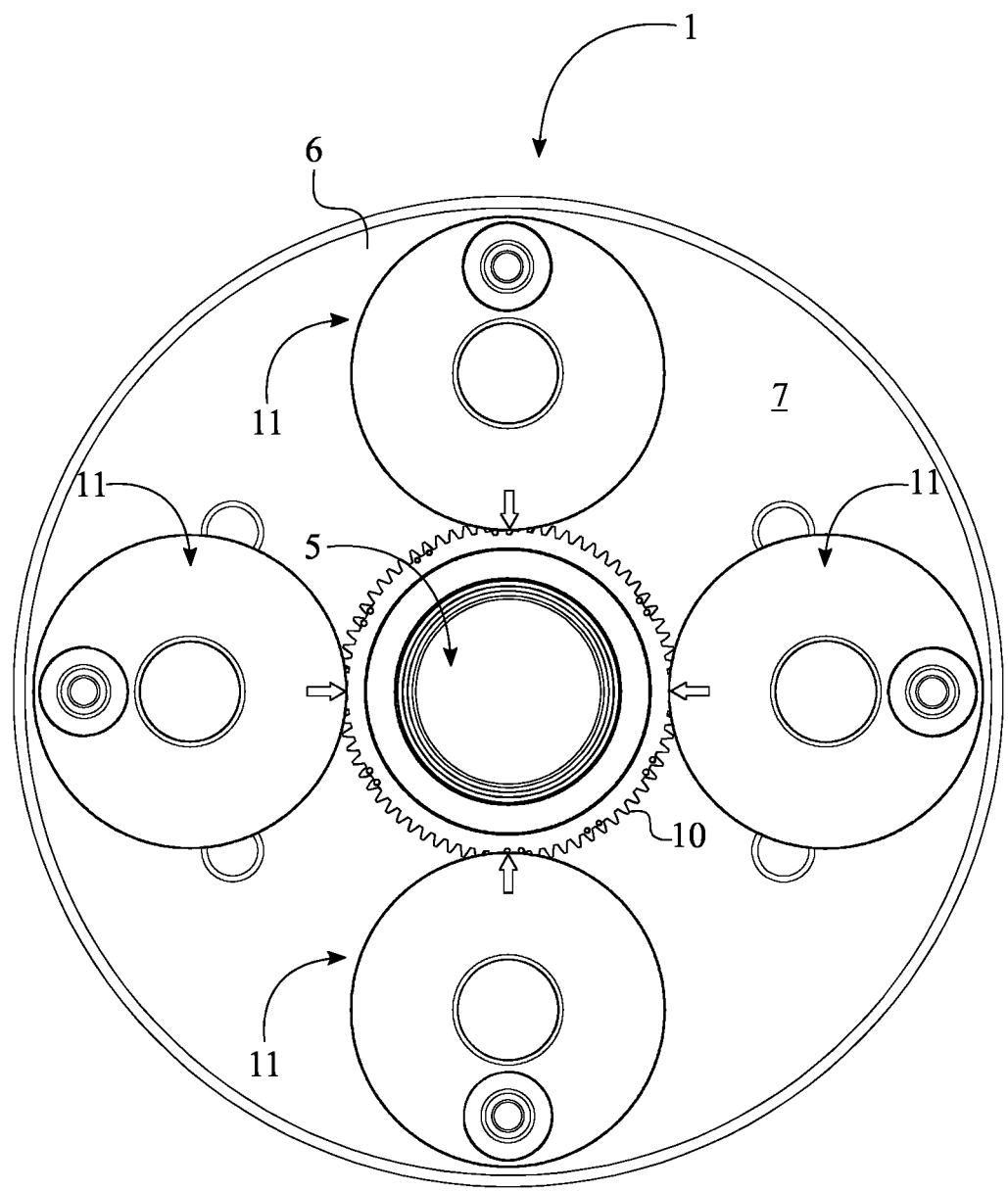
FIG. 3 is a front view of the present invention.
Figure 4:
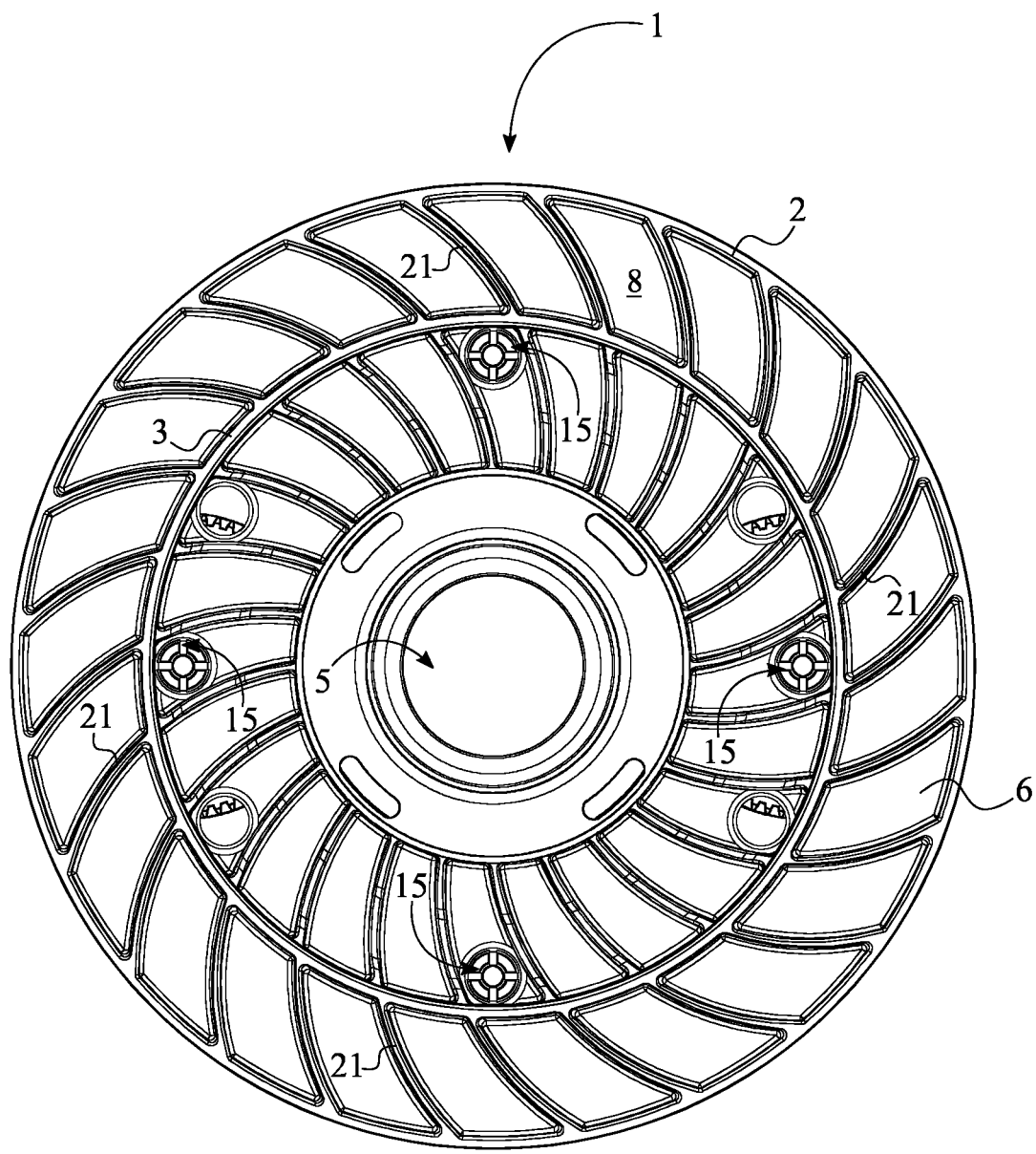
FIG. 4 is a rear view of the present invention.
Figure 6:
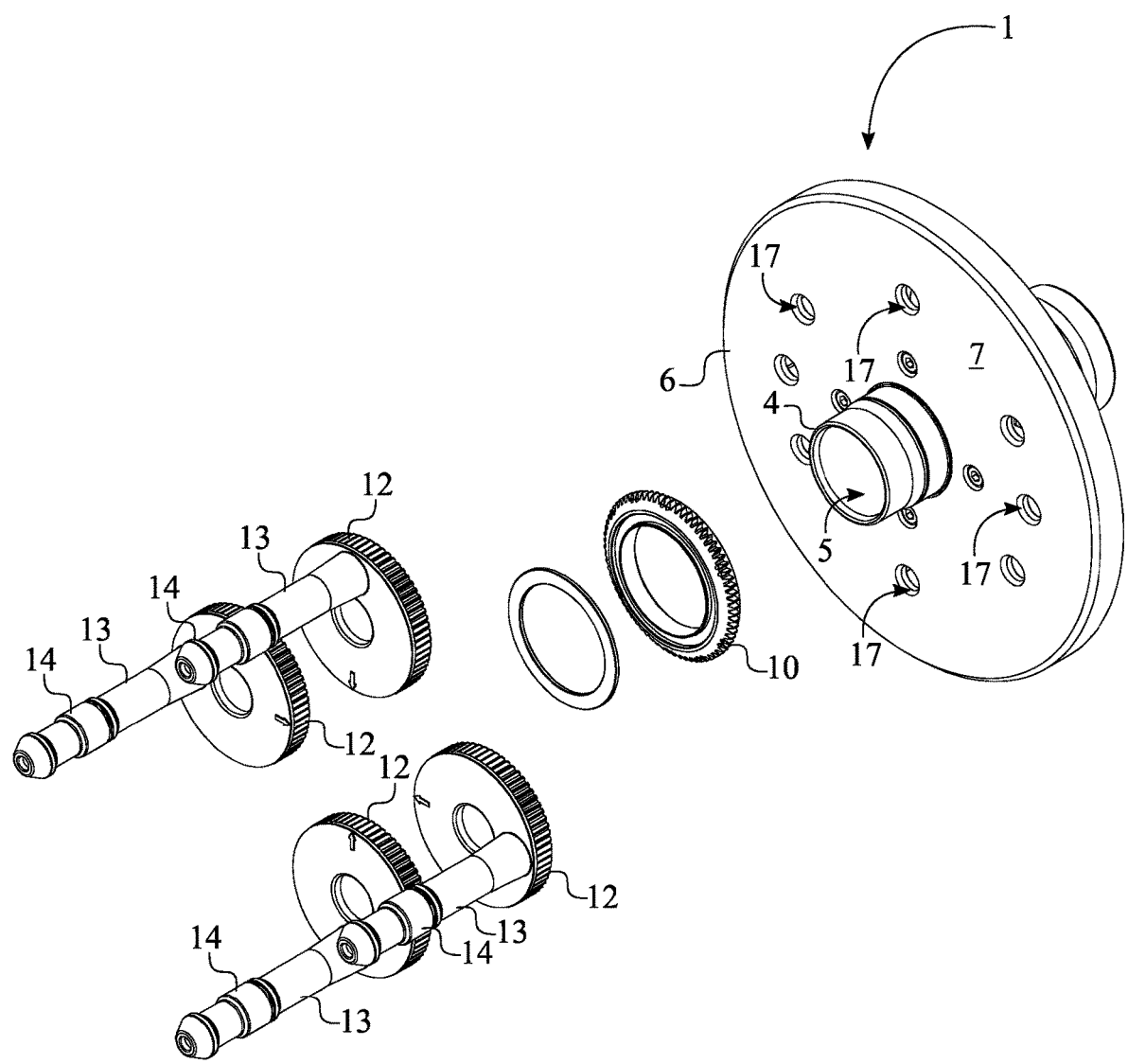
FIG. 6 is an exploded view of the present invention showing the planetary gear assembly being disassembled from the adapter plate.

Referring to FIGS. 4, 6, and 8, the present invention may further comprise a plurality of mounting holes 17 so that the plurality of adjustable-bolt-pattern gears 11 can be attached to the adapter plate 1 through the release mechanism 15. The plurality of mounting holes 17 normally traverses through the adapter plate 1. As a result, each of the plurality of mounting holes 17 enables one of the plurality of adjustable-bolt-pattern gears 11 to be mounted onto the adapter plate 1. More specifically, the plurality of mounting holes 17 is radially positioned around the central opening 5 and the central gear 10 so that the user can change number of the plurality of adjustable-bolt-pattern gears 11 that is attached to the adapter plate 1. In other words, the release mechanism 15 for each of the plurality of adjustable-bolt-pattern gears 11 is rotatably engaged within a corresponding hole from the plurality of mounting holes 17 thus allowing the central gear 10 to be mechanically engaged with the base gear 12 for each of the plurality of adjustable-bolt-pattern gears 11.

As shown in FIG. 9, the present invention is preferably configured with eight mounting holes 17 thus allowing the user to easily construct multiple self-releasing clamping tools. For example, just by changing the number of the plurality of adjustable-bolt-pattern gears 11, the user can configure a four stud self-releasing clamping tool into a six stud self-releasing clamping tool or vice versa. When the present invention is a four stud self-releasing clamping tool, the plurality of adjustable-bolt-pattern gears 11 is mounted at 90-degree angles (0 degrees, 90 degrees, 180 degrees, and 270 degrees). When the present invention is a six stud self-releasing clamping tool, the plurality of adjustable-bolt-pattern gears 11 is mounted at 60-degree angles (0 degrees, 60 degrees, 120 degrees, 180 degrees, 240 degrees, and 300 degrees). In order to accommodate the multiple configurations of the self-releasing clamping tools, the central gear 10 preferably has 72 teeth so that the base gear 12 for each of the plurality of adjustable-bolt-pattern gears 11 can operatively engage with the central gear 10.

In reference to FIG. 6, each of the plurality of adjustable-bolt-pattern gears 11 may further comprise a connector tip 14. The connector tip 14 is a detachable fastener that is terminally attached to the support stud 13, wherein the connector tip 14 and the base gear 12 are oppositely positioned of each other about the support stud 13. Thus positioned, the connector tip 14 facilitates mounting and retaining the present invention on the wheel.

Figure 5:
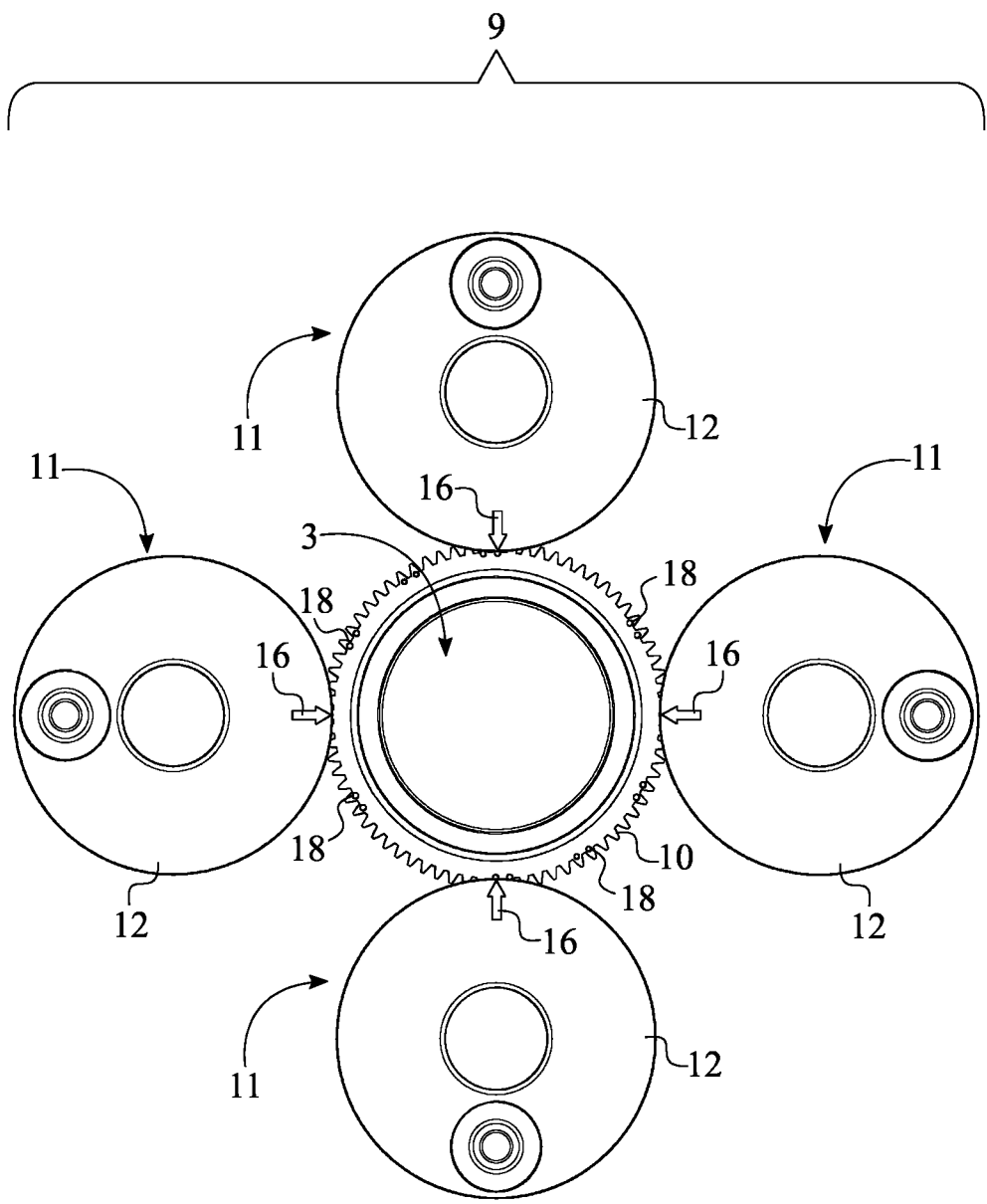
FIG. 5 is a front view of the planetary gear assembly of the present invention.

Referring to FIGS. 5 and 7, the present invention is designed to facilitate balancing wheels of varying shape and size. To that end, the present invention may further comprise a plurality of alignment indicia 18. Additionally, each of the plurality of adjustable-bolt-pattern gears 11 may further comprise at least one alignment marker 16. This enables the user to rearrange the plurality of adjustable-bolt-pattern gears 11 to correspond to the location of the lug-holes of the wheel being balanced. More specifically, the plurality of alignment indicia 18 is radially distributed around the central gear 10. The alignment marker 16 is superimposed onto the base gear 12 and positioned offset from the support stud 13. Further, the alignment marker 16 for each of the plurality of adjustable-bolt-pattern gears 11 is aligned to a corresponding indicium from the plurality of alignment indicia 18. As a result, the operator is able to arrange the plurality of adjustable-bolt-pattern gears 11 to correspond to the lug-holes of the wheel by aligning the alignment markers 16 with the correct alignment indicia 18. Then, the support stud 13 for each of the plurality of adjustable-bolt-pattern gears 11 can be aligned to a corresponding lug-hole by lining up the alignment marker 16 with the corresponding indicium. Accordingly, the plurality of alignment indicia 18 may include markers that indicate the shape and size of the wheel being balanced. The user is able to employ the present invention to couple the wheel to the wheel balancing machine by lining up the lining up the alignment marker 16 for each of the plurality of adjustable-bolt-pattern gears 11 with the corresponding indicium for the wheel.

The present invention can optionally comprise a lock plate and an annular cover plate. More specifically, the lock plate is mounted onto the adapter plate 1 and positioned over the central gear 10. The annular cover plate is rotatably mounted in between the central gear 10 and the lock plate. Consequently, the lock plate and the annular cover plate prevent the central gear 10 from becoming detached from the adapter plate 1. Since the central opening 5 traverses through the connector plate 6, the lock plate and the annular cover plate are also concentrically aligned to the central opening 5. As a result, the lock plate and the annular cover plate do not prevent the present invention from being mounted onto the wheel balancing machine.

In reference to FIG. 6, the present invention may further comprise a collar 4. The collar 4 ensures that the central axis is collinearly aligned to a central axis of the wheel while the plurality of adjustable-bolt-pattern gears 11 is engaged into the lug-holes of the wheel. The collar 4 is concentrically positioned around the central opening 5 and laterally mounted onto the front surface 7 of the adapter plate 1. As a result, the central gear 10 is laterally and rotatably mounted around the collar 4 so that the plurality of adjustable-bolt-pattern gears 11 can rotatably engaged with the central gear 10.

In reference to FIGS. 9 and 10, the adapter plate 1 may further comprise an outer annular body 2. More specifically, the outer annular body 2 is concentrically positioned to the connector plate 6 and perimetrically connected onto the rear surface 8 of the connector plate 6. In other words, the inner annular body 3 is positioned within the outer annular body 2 and the central opening 5 as the outer annular body 2 is positioned flushed with the outer edge of the connector plate 6. As shown in FIGS. 9 and 10, a second depth 20 of the outer annular body 2 is defined from a free edge of the outer annular body 2 to the connector plate 6. The first depth 19 of the inner annular body 3 is defined from a free edge of the inner annular body 3 to the connector plate 6. In order for the operator to easily place their thumb over the outer edge and reach the base gear 12, the second depth 20 is smaller than the first depth 19 within the present invention.

In reference to FIG. 9, the present invention may further comprise a plurality of structural ribs 21. The plurality of structural ribs 21 is terminally connected to the outer annular body 2, the inner annular body 3, and the rear surface 8 of the connector plate 6 to improve the structural integrity of the adapter body. Furthermore, each of the plurality of structural ribs 21 is radially interspaced around the central opening 5. As a result, the present invention can eliminate any structural misalignment during assembly process and maintenance cycles.

Although the invention has been explained in relation to its preferred embodiment, it is to be understood that many other possible modifications and variations can be made without departing from the spirit and scope of the invention as hereinafter claimed.

What is claimed is:

1. A self-releasing clamping tool comprising:
an adapter plate;
a planetary gear assembly;
a plurality of alignment indicia;
the planetary gear assembly comprising a central gear and a plurality of adjustable-bolt-pattern gears;
the adapter plate comprising an inner annular body, a central opening, and a connector plate;
each of the plurality of adjustable-bolt-pattern gears comprising a base gear, a support stud, a release mechanism, and at least one alignment marker;
the inner annular body being concentrically positioned within the connector plate;
the inner annular body being adjacently connected onto a rear surface of the connector plate;
the central opening normally traversing through the connector plate;
the central opening being concentrically positioned within the inner annular body;
the central gear being rotatably mounted to a front surface of the connector plate;
the plurality of adjustable-bolt-pattern gears being distributed around the central gear;
the plurality of adjustable-bolt-pattern gears being detachably and rotatably mounted to the front surface of the connector plate;
the plurality of adjustable-bolt-pattern gears being mechanically engaged to the central gear;
the release mechanism being concentrically connected to the base gear;
the support stud being terminally mounted to the base gear;
the release mechanism and the support stud being oppositely oriented from each other about the base gear;
the support stud being positioned offset from the release mechanism;

the plurality of alignment indicia being distributed around the central gear;

the alignment marker being superimposed onto the base gear; and the alignment marker for each of the plurality of adjustable-bolt-pattern gears being aligned to a corresponding alignment indicium from the plurality of alignment indicia.

2. The self-releasing clamping tool as claimed in claim 1 comprising:

each of the plurality of adjustable-bolt-pattern gears further comprising a connector tip;

the connector tip being terminally attached to the support stud; and the connector tip and the base gear being oppositely positioned of each other about the support stud.

3. The self-releasing clamping tool as claimed in claim 1 comprising:

a plurality of mounting holes;

the plurality of mounting holes normally traversing through the connector plate;

each of the plurality of mounting holes being radially distributed around the central opening;

the release mechanism for each of the plurality of adjustable-bolt-pattern gears being rotatably engaged within a corresponding mounting hole from the plurality of mounting holes; and the central gear being mechanically engaged with the base gear for each of the plurality of adjustable-bolt-pattern gears.

4. The self-releasing clamping tool as claimed in claim 1, wherein a first depth of the inner annular body is greater than 10 millimeters.

5. The self-releasing clamping tool as claimed in claim 1 comprising:

the adapter plate further comprising an outer annular body;

the outer annular body being concentrically positioned to the connector plate;

the outer annular body being perimetrically connected onto the rear surface of the connector plate; and the inner annular body being positioned within the outer annular body and the central opening.

6. The self-releasing clamping tool as claimed in claim 5, wherein a second depth of the outer annular body is smaller than a first depth of the inner annular body.

7. The self-releasing clamping tool as claimed in claim 5 comprising:

a plurality of structural ribs;

the plurality of structural ribs being terminally connected to the outer annular body, the inner annular body, and the connector plate; and the plurality of structural ribs being radially interspersed around the central opening.

8. The self-releasing clamping tool as claimed in claim 1 comprising:

a collar;

the collar being adjacently positioned around the central opening;

the collar being laterally mounted onto the front surface of the connector plate; and the central gear being laterally and rotatably mounted around the collar.

9. A self-releasing clamping tool comprising:

an adapter plate;

a planetary gear assembly;

a plurality of alignment indicia;

the planetary gear assembly comprising a central gear and a plurality of adjustable-bolt-pattern gears;

the adapter plate comprising an inner annular body, a central opening, and a connector plate;

each of the plurality of adjustable-bolt-pattern gears comprising a base gear, a support stud, a release mechanism, and at least one alignment marker;

the inner annular body being concentrically positioned within the connector plate;

the inner annular body being adjacently connected onto a rear surface of the connector plate;

the central opening normally traversing through the connector plate;

the central opening being concentrically positioned within the inner annular body;

the central gear being rotatably mounted to a front surface of the connector plate;

the plurality of adjustable-bolt-pattern gears being distributed around the central gear;

the plurality of adjustable-bolt-pattern gears being detachably and rotatably mounted to the front surface of the connector plate;

the plurality of adjustable-bolt-pattern gears being mechanically engaged to the central gear;

a first depth of the inner annular body is greater than 10 millimeters, the release mechanism being concentrically connected to the base gear;

the support stud being terminally mounted to the base gear;

the release mechanism and the support stud being oppositely oriented from each other about the base gear;

the support stud being positioned offset from the release mechanism;

the plurality of alignment indicia being distributed around the central gear;

the alignment marker being superimposed onto the base gear; and the alignment marker for each of the plurality of adjustable-bolt-pattern gears being aligned to a corresponding alignment indicium from the plurality of alignment indicia.

10. The self-releasing clamping tool as claimed in claim 9 comprising:

each of the plurality of adjustable-bolt-pattern gears further comprising a connector tip;

the connector tip being terminally attached to the support stud; and the connector tip and the base gear being oppositely positioned of each other about the support stud.

11. The self-releasing clamping tool as claimed in claim 9 comprising:

a plurality of mounting holes;

the plurality of mounting holes normally traversing through the connector plate;

each of the plurality of mounting holes being radially distributed around the central opening;

the release mechanism for each of the plurality of adjustable-bolt-pattern gears being rotatably engaged within a corresponding mounting hole from the plurality of mounting holes; and the central gear being mechanically engaged with the base gear for each of the plurality of adjustable-bolt-pattern gears.

12. The self-releasing clamping tool as claimed in claim 9 comprising:

the adapter plate further comprising an outer annular body;

the outer annular body being concentrically positioned to the connector plate;

the outer annular body being perimetrically connected onto the rear surface of the connector plate; and the inner annular body being positioned within the outer annular body and the central opening.

13. The self-releasing clamping tool as claimed in claim 12, wherein a second depth of the outer annular body is smaller than the first depth of the inner annular body.

14. The self-releasing clamping tool as claimed in claim 12 comprising:

a plurality of structural ribs;

the plurality of structural ribs being terminally connected to the outer annular body, the inner annular body, and the connector plate; and the plurality of structural ribs being radially interspersed around the central opening.

15. The self-releasing clamping tool as claimed in claim 9 comprising:

a collar;

the collar being adjacently positioned around the central opening;

the collar being laterally mounted onto the front surface of the connector plate; and the central gear being laterally and rotatably mounted around the collar.

\* \* \* \* \*